Dec. 11, 1951  B. MILLER ET AL  2,577,906
TRACTOR MOUNTED BRUSH SAW
Filed Oct. 10, 1949  3 Sheets-Sheet 1
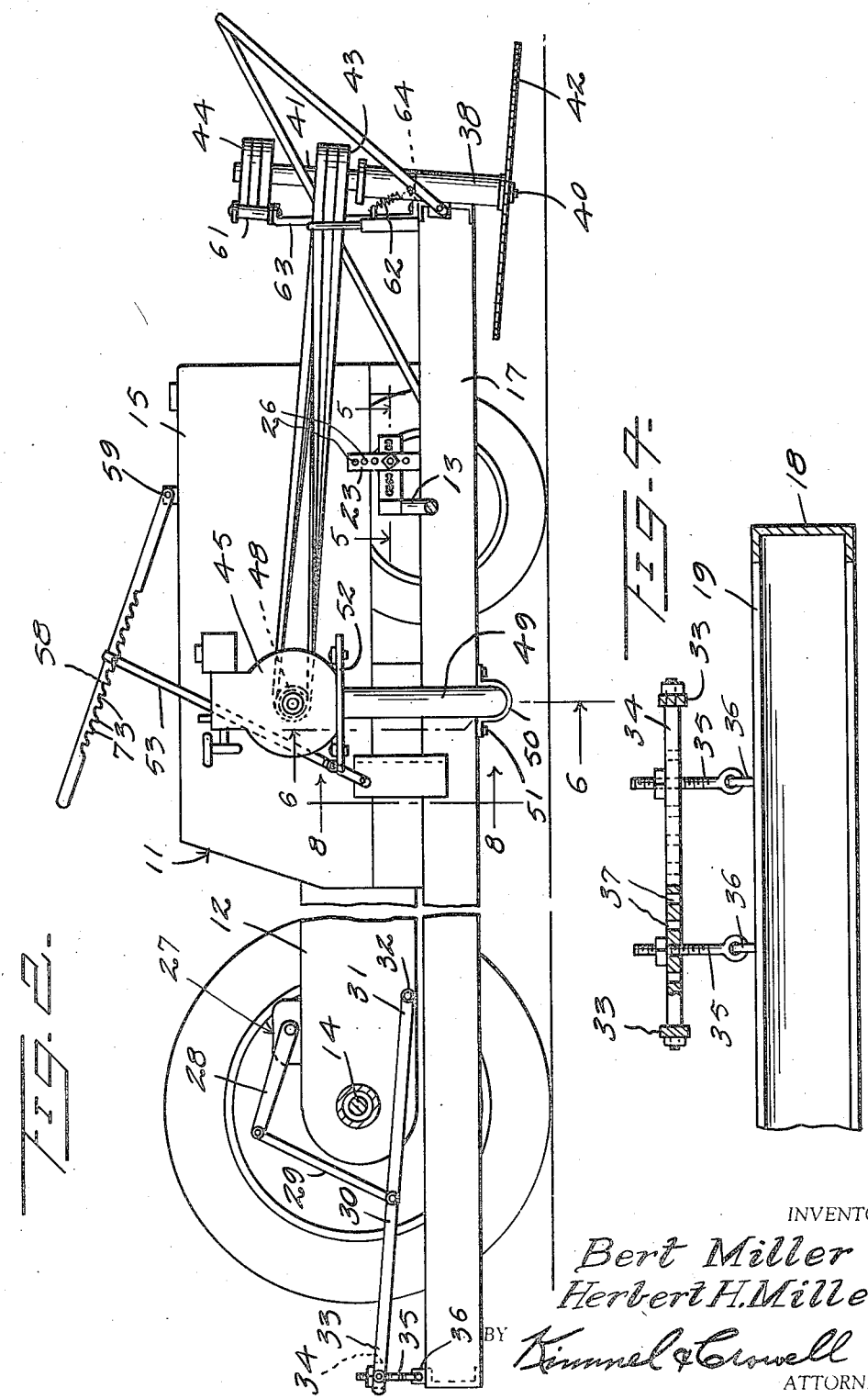
INVENTORS
*Bert Miller*
*Herbert H. Miller*
BY
ATTORNEYS

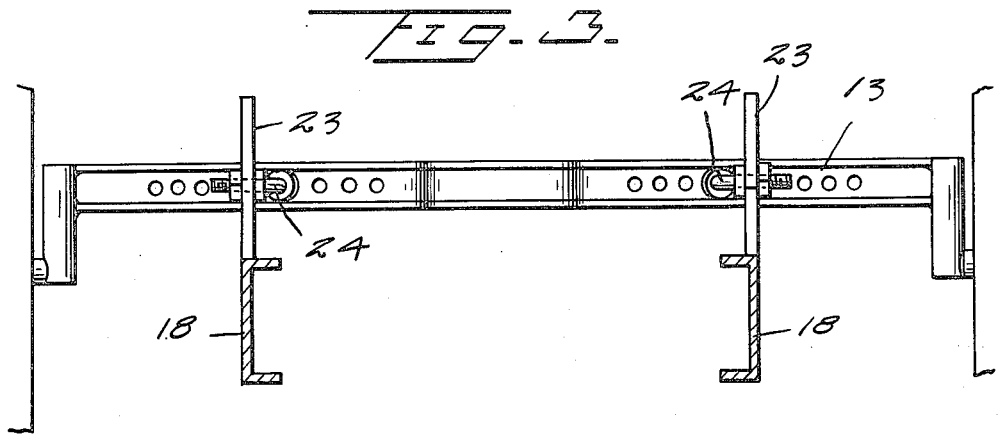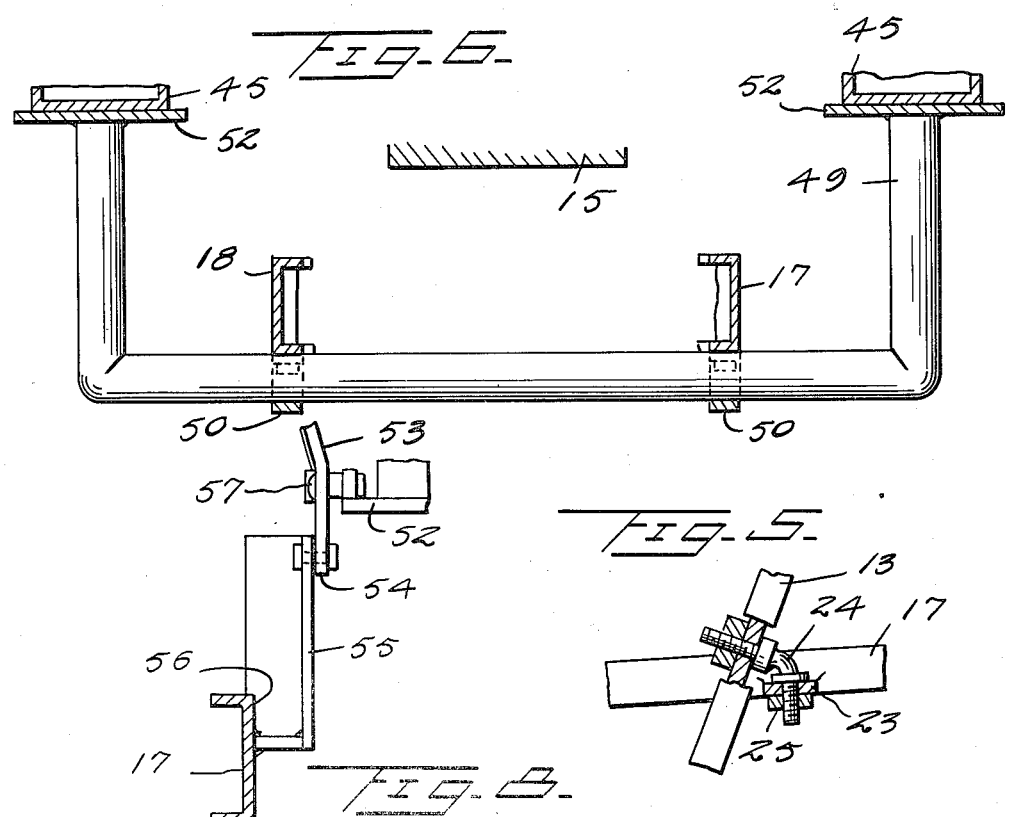

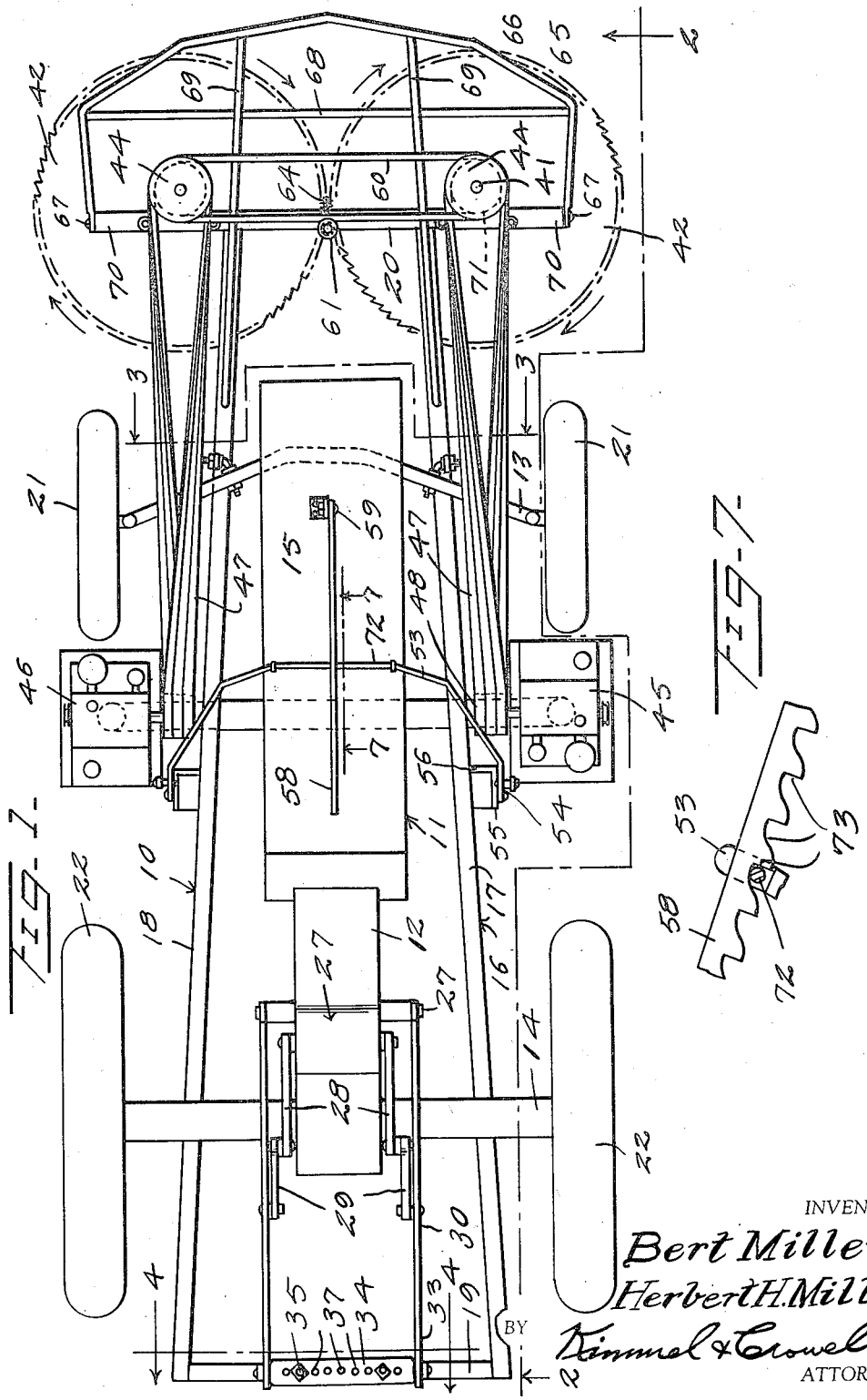

Patented Dec. 11, 1951

2,577,906

UNITED STATES PATENT OFFICE 2,577,906

TRACTOR MOUNTED BRUSH SAW

Bert Miller and Herbert H. Miller, Brunswick, Ga.

Application October 10, 1949, Serial No. 120,506

5 Claims. (Cl. 143—43)

This invention relates to a portable saw and more particularly a plurality of powerized saws adjustably mounted on a tractor and capable of combined operation with the tractor to cut a swath through a brush undergrowth.

Prior to this time, various unsuccessful attempts have been made to develop power equipment capable of satisfactorily cutting heavy underbrush and like growth, including small trees, from a given area. The problem difficult of solution has been to attain sufficiently dependable power in a unit light enough for the maneuverability required. The usual practice is to operate the cutters of such devices from the power source used to drive the carrying mechanism, which means that the saws can only be rotated in accordance with the speed at which the tractor engine is operated. Other equipment has been developed in which the cutter is maneuvered by hand, which has the disadvantage of being incapable of carrying sufficient power to accomplish satisfactory cutting through heavy underbrush or trees of reasonable size, as well as being slow and inefficient in operation.

In the present invention the saws are adjustably carried and operated in conjunction with individual power units correlated to provide sufficient cutting power independent of a prime mover driving means.

One of the advantages is that the saws can be operated at the most efficient speed for light or heavy cutting, as the occasion demands, irrespective of the terrain. It is obvious that in operating through hilly land or through swamps, the driving power of the prime mover would either have to be excessive or else be insufficient to carry both the driving load and the sawing load. Another advantage is that by having the saws individually powerized allows for a pivotal arrangement of the carrying frame which enables the operator to quickly adjust his saws relative to the ground over which he is cutting, so as to allow for changing conditions in the terrain.

It is among the objects of this invention to provide a highly maneuverable sawing unit capable of being mounted on a conventional type of tractor.

Another object is to provide a rugged portable saw unit inexpensive of manufacture and maintenance.

A still further object is to provide a pair of circular saws rotatable forwardly of a tractor for horizontal cutting relative to the ground level.

Still another object is to provide a portable cutting device having individual power units connected together and correlated to provide for combined power usable at one or both said saws.

Further objects of the invention will become apparent from the following description when taken in conjunction with the drawings in which like numbers refer to like parts in the different figures.

In the drawings:

Figure 1 is a plan view of the present invention mounted on a conventional tractor;

Figure 2 is a side view taken on line 2—2 of Figure 1;

Figure 3 is a sectional view taken on line 3—3 of Figure 1;

Figure 4 is a sectional view taken on line 4—4 of Figure 1;

Figure 5 is a partial fragmentary view taken on line 5—5 of Figure 2;

Figure 6 is a section taken on line 6—6 of Figure 2;

Figure 7 is a side detail view taken on line 7—7 of Figure 1; and

Figure 8 is a partial section taken on line 8—8 of Figure 2.

Referring in more detail to the drawings, 10 indicates generally the saw unit of this invention adapted to be mounted on a tractor 11 representing the type of tractor having a tubular main structure 12, front 13 and rear 14 axles and provided with a lift mechanism 27 extending outwardly and rearwardly from a point adjacent the rear axle and motivated by the tractor engine 15. Unit 10 is comprised of a substantially rectangular shaped frame 16 formed with two side channels 17 and 18 that extend longitudinally of the tubular main structure 12, with a slight taper at the front of the tractor 11. The side channels 17 and 18 are of sufficient length to protrude forwardly and rearwardly of the tractor as shown in Figures 1 and 2, and are joined together at the rear by a rear cross member 19 having ends welded to the side channels. The front ends of the side channels 17 and 18 are held in spaced relationship by a front cross piece 20 welded across the ends thereof. The length of the front cross piece 20 is sufficient to provide protruding ends 70 extending outwardly from the side frames. The slight taper provided in the frame 16 corresponds generally to the difference in front and rear tread widths of the tractor, as illustrated by the spacing of the front tires 21 and the rear tires 22. The frame 16 is pivotally suspended longitudinally of the tractor adjacent the front axle 13 by apertured uprights 23 welded to the top of each side channel 17 and 18. These uprights are secured to the front axle 13 by angular bolts 24 carried by the axle and pivotally mounted in the uprights 23 with a bearing surface 25 adapted for positioning in any one of the apertures 26 formed in the uprights. This type of mounting allows for a frame 16 to be adjustably raised or lowered relative to the axle 13, as well as capable of being pivoted about the pivot points formed by the axes of bolts 24 which allows for the front end of the frame to be raised or lowered on raising or lowering of the rear end of the frame by the tractor lift means as hereinafter explained.

The lift mechanism 27 of the tractor 11 consists of a pair of cranks 28 positioned adjacent the rear axle 14 and adapted for motivation by the tractor engine through a hydraulic or like means incorporated in the tractor drive mechanism (not shown). Dependent from each crank 28 are links 29 connected to levers 30 having the front ends 31 thereto pivoted to the tractor structure 12 at points 32 with free ends 33 extending rearwardly and connected to a rotatable cross bar 34 formed with a plurality of bolt holes 37 positioned above the rear cross member 19 of the frame 16. Cross bar 34 is connected to the frame cross member 19 by several eye bolts 35 pivotally mounted in eyes 36 formed integrally with and extending upwardly of said cross member 19. This manner of suspension and connection of the lift to the rear end of the frame allows for quick tipping of the front of the frame up or down as required to cut brush at a uniform ground level irrespective of sudden changes in said ground level. However, in those cases where the saw is to be operated at a sufficient distance above the ground level to allow for reasonable changes in the terrain, or the cutting is not limited to a specified height from the ground level, it is obvious that the frame may be fixedly mounted to the axles of the tractor by U-shaped bolts of suitable length.

Carried by the front cross piece 20 and spaced a suitable distance from each end 70 thereof are a pair of vertical spindle mounts 38 centered relative to each other a suitable distance apart to allow for the rotation of a plurality of saws in the same plane about their centers as hereinafter described. The spindle mounts 38 are of sufficient length to position the saw spindles 39 rotatably mounted therein with a bottom end 40 and a top end 41 of each spindle protruding therefrom. Fixed to the bottom end 40 of each spindle 39 is a conventional type of circular saw blade 42 of sufficient diameter that when rotatably positioned the pair of blades substantially close the space between the pair of spindles. Fixed to the top end 41 of each spindle are a pair of pulleys, one of which is designated as a driven pulley 43 and the other as the cross drive pulley 44. Both sets of pulleys 43 and 44 are formed with suitable sheaves 71 positioned for driven and drive engagement respectively with a plurality of V-shaped belts hereinafter described.

Individual power units 45 and 46 are provided for rotation of each saw 42 through longitudinally running motor belts 47 engaging with driven pulley 43 of each saw. Each of the power units 45 and 46 consists of a suitable self-contained air cooled gasoline engine or like power means adapted to deliver rotative force from a motor pulley 48 protruding therefrom and arranged to drive its respective saw 42 through the V-shaped longitudinally running motor belts 47. The motor belts 47 are shown as three distinct belts arranged to provide a flexible drive means, however, it is obvious that any other suitable drive means that will provide the dependability of operation desired could be utilized.

The power units 45 and 46 are mounted at each side of the tractor engine 15 on flat plates 52 independently carried by a U-shaped support member 49 rotatably mounted under the frame 16 by means of mount straps 50 encircling said member with the ends bolted to the frame channels 17 and 18 by suitable bolt means 51. Having the U-shaped support member 49 rotatably mounted in this manner allows for the power units 45 and 46 to be rocked toward and away from the saws to increase or decrease the tension on the belts 47. Securing the motor units to the U-shaped support member is provided by the flat motor plates 52 welded across the upwardly extended ends of the support with the motor units bolted to the plates by suitable bolt means, as best shown in Figure 2. The rockability of the motor units 45 and 46 is utilized as a clutch means in operating the saws 42. It is apparent that to rock the motor units 45 and 46 away from the saws whereby the V-shaped belts 47 are moved into close engagement with the sheaves of the motor pulleys 48 will effect elimination of slippage therebetween and rotate the saws under direct drive of the motor units and inversely by rocking the motor units toward the saws will allow the V-shaped belts to ride out of the pulley sheaves and effect slippage therebetween which is utilized to stop rotation of the saws as desired by the operator. Manual means for rocking the motor units 45 and 46 and holding them in an engaged or released position is provided for by a pivoted semicircular lever or metal strap 53 formed to extend over the tractor engine 15 with opposite ends 54 pivoted to a bracket 55 secured to the frame channels 17 and 18, as at 56, and intermediately lever connected to the motor unit support plates 52. Means for securing the strap 53 in any desired position is provided by a racheted bar 58 having one end pivoted to the top of the tractor engine 15, as at 59, with the rachet portion in gravital engagement with the strap 53, having a round section 72 adapted for engagement in the notches 73 of the ratchet.

Extending between the two saw spindles is a third set of V-shaped belts 60 which form a cross driving means therefor. These cross drive belts 60 are of sufficient length to drivingly engage in the sheaves of the cross drive pulleys 44 fixed to the top ends of the spindles 41 to correlate the operation of the saws 42. Hingedly mounted on the front cross piece 20 for engagement with the cross drive belts 60 is an idler 61. The idler 61 is held in close engagement with the belts 60 under the urge of a tensioning spring 62 that extends between the idler mount-arm 63 and a forwardly extending spring anchor-arm 64, carried by the front cross piece 20 to maintain the belts under proper driving tension. It has been found that by tying the two saws 42 together for correlated operation by either or both of the power units 45 and 46, adds considerable to the efficiency, not only of the power units themselves, but also of the operation of the saws. The efficiency of the motor units is increased in that it allows them to be operated at their most efficient speed for normal operation of the saws rather than at full power output as would be required to avoid stalling thereof on sudden engagement with a heavy growth. The efficiency of the saws is increased in that it allows for working through heavy growth under the combined power of both units. These conditions often occur in cutting brush where the load is extremely irregular, reaching maximum when both saws strike trees simultaneously, and minimum when both saws are cutting relatively light underbrush. In cutting a straight swath, both of these conditions are likely to occur at intermittent intervals not readily foreseen by the operator. With the power units and saws tied together as disclosed by this invention provides for correlated cutting and the combined output of the power units can be utilized to cut a tree with the other saw remaining idle as a matter of routine operation so as to not require special maneuvering of the prime mover by which the saw is being operated. In this manner a much larger acreage per day coverage for a given unit can be attained. Also, it is obvious that neither unit need be operated at as full a power output when the torque of the lesser load unit can be automatically utilized as a booster means. It is also to be noted that both saws 42 are adapted for rotation in the same direction which avoids any tendency of the saws to pull or gather the cuttings into the saws, but rather effects a clearing away of the brush to both sides of cutting unit 10.

Extending around the front of the frame 16 is a guard or bumper, shown generally as 65, having a front rail 66 that extends forwardly and upwardly at an angle above the saws 42 with opposite ends bolted to the frame endpiece 20, as at 67. Weld-joined to the rail 66 are intermediate transverse braces 68 and a pair of longitudinal braces 69. The longitudinal braces 69 are spaced substantially as extensions of the side channels 17 and 18 with ends spaced from the front rail 66 secured to the said channels so as to convey thrust forces exerted against the bumper to the channels. The elevation of the rail 66 is such as to effect pushing back of the brush and trees being cut on forward movement of the tractor and also guard the saw driving mechanism from possible damage resulting from the tumbling of trees and brush thereinto.

It is apparent some changes may be made in the arrangement, construction and combination of the various parts of the present invention without departing from the spirit thereof, and it is the intention to cover by the claims such changes as may be reasonably included within the scope of said claims.

The invention claimed is:

1. A portable sawing device for use with a tractor having a rearwardly extended lift means mechanism comprising a frame adapted for pivotal suspension under the tractor at a point spaced from the front end of said frame with its rear end connected to the tractor lift, a plurality of circular saws carried by the frame for horizontal rotation, individual power means carried by the frame and drivingly engaged with each respective saw for rotation thereof.

2. A portable sawing device for use with a tractor equipped with lift means comprising a frame suspended from said tractor at spaced points, one of said points being comprised of transversely spaced pivots with the other point of suspension being spaced rearwardly of the first said point of suspension and connected to said tractor lift so as to effect pivotal raising and lowering of the ends of said frame by operation of the tractor lift means, horizontally positioned circular saws carried by the frame in spaced relationship to each other in a given plane, and individual power means drivingly connected to each saw.

3. A portable sawing device for operation with a tractor having a lift means extending rearwardly therefrom comprising a frame pivotally suspended intermediate its ends from the tractor with a free end connected to the tractor lift adapted to raise and lower said free end, saws rotatably mounted on the other end of the frame for rotation forwardly of said frame in a horizontal plane, individual power units drivingly connected to each of said saws for rotation thereof, and drive means connecting the saws together for correlated rotation relative to each other.

4. A sawing device as claimed in claim 3 in which said independent power units are connected to each saw by a flexible drive means and are pivotally mounted on the frame for limited longitudinal movement relative to said frame to vary the tension of said drive means.

5. A sawing device as claimed in claim 3 in which said individual power units are connected to each saw by a flexible drive means and are pivotally mounted on the frame for limited longitudinal movement relative to said frame to vary the tension of said drive means, including a second flexible drive means extending between the saws and placed under suitable tension for correlated rotation of said saws.

his
    BERT  X  MILLER.
                mark
    HERBERT H. MILLER.

Witnesses to mark:
  F. HILL,
  W. C. SCOTT.

REFERENCES CITED

The following references are of record in the file of this patent:

UNITED STATES PATENTS

| Number | Name | Date |
|---|---|---|
| 638,553 | Burke | Dec. 5, 1899 |
| 1,454,901 | McArthur | May 15, 1923 |
| 1,645,924 | Palmigiano | Oct. 18, 1927 |
| 2,216,971 | Farmer | Oct. 8, 1940 |
| 2,411,623 | Jaques | Nov. 26, 1946 |
| 2,441,431 | McDonald | May 11, 1948 |
| 2,455,840 | Webb | Dec. 7, 1948 |

FOREIGN PATENTS

| Number | Country | Date |
|---|---|---|
| 211,980 | Germany | July 17, 1908 |